US012231557B2

(12) United States Patent
Choi et al.

(10) Patent No.: US 12,231,557 B2
(45) Date of Patent: Feb. 18, 2025

(54) METHOD FOR PERFORMING SHARED SECRET KEY RENEWING AND ELECTRONIC DEVICE FOR SUPPORTING SAME

(71) Applicant: SAMSUNG ELECTRONICS CO., LTD., Suwon-si (KR)

(72) Inventors: Seongsu Choi, Suwon-si (KR); Junhak Lim, Suwon-si (KR); Chounjong Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 17/682,123

(22) Filed: Feb. 28, 2022

(65) Prior Publication Data
US 2022/0294625 A1  Sep. 15, 2022

Related U.S. Application Data

(63) Continuation of application No. PCT/KR2022/001243, filed on Jan. 24, 2022.

(30) Foreign Application Priority Data

Mar. 4, 2021  (KR) ........................ 10-2021-0028689

(51) Int. Cl.
*H04L 9/08* (2006.01)
(52) U.S. Cl.
CPC ............ *H04L 9/0891* (2013.01); *H04L 9/085* (2013.01); *H04L 9/088* (2013.01)
(58) Field of Classification Search
CPC ..................................................... H04L 9/0891
See application file for complete search history.

(56) References Cited

U.S. PATENT DOCUMENTS

| 11,343,672 | B2 * | 5/2022 | Tal | H04L 9/0643 |
| 2007/0288997 | A1 * | 12/2007 | Meier | G06Q 20/3674 726/4 |

(Continued)

FOREIGN PATENT DOCUMENTS

| CN | 101626370 | 1/2010 |
| KR | 10-2006-0097572 | 9/2006 |

(Continued)

OTHER PUBLICATIONS

Search Report and Written Opinion dated May 8, 2023 issued in International Patent Application No. PCT/KR2022/001243.
Search Report dated May 6, 2022 in International Patent Application No. PCT/KR2022/001243 and English-language translation.
Written Opinion dated May 6, 2022 in International Patent Application No. PCT/KR2018/001243 and English-language translation.

(Continued)

*Primary Examiner* — Bradley W Holder
(74) *Attorney, Agent, or Firm* — Nixon & Vanderhye, P.C.

(57) ABSTRACT

An electronic device according to various embodiments may include: a communication circuit, a memory, and at least one processor functionally connected to the communication circuit and the memory, wherein the at least one processor is configured to: perform wireless communication with an external electronic device through the communication circuit, based on a shared secret key generated by the electronic device in a process of configuring an association with the external electronic device, transmit, to the external electronic device through the communication circuit, a renewal frame for renewing the shared secret key, at a time point at which a lifetime of the shared secret key expires or at a time point a specified time ahead of the time point at which the lifetime of the shared secret key expires, and renew the shared secret key to perform wireless communication with the external electronic device through the communication circuit, based on the renewed shared secret key.

20 Claims, 14 Drawing Sheets

(56) References Cited

U.S. PATENT DOCUMENTS

| | | |
|---|---|---|
| 2009/0019284 A1 | 1/2009 | Cho et al. |
| 2009/0086973 A1 | 4/2009 | Buddhikot et al. |
| 2010/0048175 A1* | 2/2010 | Osborn ............... H04W 12/069 455/411 |
| 2012/0163600 A1* | 6/2012 | Kim ...................... H04W 12/04 380/270 |
| 2013/0036305 A1 | 2/2013 | Yadav et al. |
| 2013/0243194 A1 | 9/2013 | Hawkes et al. |
| 2013/0263223 A1 | 10/2013 | Cherian et al. |
| 2014/0181904 A1 | 6/2014 | Craig et al. |
| 2015/0281952 A1* | 10/2015 | Patil ...................... H04W 12/06 713/168 |
| 2016/0135053 A1 | 5/2016 | Lee et al. |
| 2016/0295413 A1 | 10/2016 | Liu et al. |
| 2018/0131519 A1 | 5/2018 | Le Scouarnec et al. |

FOREIGN PATENT DOCUMENTS

| | | |
|---|---|---|
| KR | 10-2011-0046260 | 5/2011 |
| KR | 10-2012-0074234 | 7/2012 |
| KR | 10-2016-0138057 | 12/2016 |
| KR | 10-2018-0050233 | 5/2018 |

OTHER PUBLICATIONS

Jeon, Sang Hoon, "A study on the Efficient OKTEK (One-way Key-chain for TEK) for Realtime Digital Contents Transmission," Journal of the Korea Society of Computer and Information, vol. 14(iii), Mar. 2009, pp. 103-111.

Extended Search Report dated May 8, 2023 in European Patent Application No. 22705365.9.

* cited by examiner

METHOD FOR PERFORMING SHARED SECRET KEY RENEWING AND ELECTRONIC DEVICE FOR SUPPORTING SAME

CROSS-REFERENCE TO RELATED APPLICATIONS

This application is a continuation of International Application No. PCT/KR2022/001243 designating the United States, filed on Jan. 24, 2022, in the Korean Intellectual Property Receiving Office and claiming priority to Korean Patent Application No. 10-2021-0028689, filed on Mar. 4, 2021, in the Korean Intellectual Property Office, the disclosures of which are incorporated by reference herein in their entireties.

BACKGROUND

Field

The disclosure relates to a method for renewing a shared secret key and an electronic device supporting the same.

Description of Related Art

A wireless communication system has been widely developed to provide various types of communication services such as a voice or data. In general, the wireless communication system corresponds to a multiple-access system which shares an available system resource (frequency, bandwidth, or output power) to support communication with multiple users. Examples of the multiple-access system may include a code-division multiple access (CDMA) system, a frequency-division multiple access (FDMA) system, a time-division multiple access (TDMA) system, an orthogonal frequency-division multiple access (OFDMA) system, a single-carrier frequency-division multiple access (SC-FDMA) system, and a multi-carrier frequency-division multiple access (MC-FDMA) system.

Recently, with development of information and communication technologies, various wireless communication technologies have been developed. Among the wireless communication technologies, a wireless local area network (WLAN) corresponds to a technology which enables wireless access to the Internet at home or office, or in a specific service provision area using an electronic device such as a smartphone, a personal digital assistant (PDA), and a laptop computer, based on a wireless frequency technology.

To secure flexibility in communication between devices in the WLAN system, various protocols for direct communication between devices without passing through a management medium such as a base station or an access point have been proposed.

Wi-Fi Protected Access (WPA) corresponds to standardization of Wi-Fi among wireless communication technologies, by Wi-Fi Alliance (WFA). In Wi-Fi technology, since multiple electronic devices use an open network, security is one of the most important issues, WFA has continuously provided solutions to security of the Wi-Fi technology, and, currently, Wi-Fi Protected Access version 3 (WPA3) is applied as a security technology of the Wi-Fi technology.

A Wi-Fi technology may perform encryption in a wireless link using a pairwise transient key (PTK) corresponding to a shared transient key, wherein a pairwise master key (PMK) corresponding to a shared secret key may be used as an auxiliary key to derive the PTK. The PMK may be generated through a simultaneous authentication of equals (SAE) handshake process or an opportunistic wireless encryption (OWE) association process.

When one PMK is used for a predetermined time or longer, a security problem of exposure of a shared key to the outside may occur. To address the security problem, the PMK may generally have a lifetime and perform a procedure of renewing the PMK when the lifetime expires. The PMK renewal procedure is performed through authentication and association processes, and a wireless network disassociation may occur from the expiration of the lifetime until the renewal of the PMK.

SUMMARY

Embodiments of the disclosure provide a method for renewing a PMK while minimizing and/or reducing a wireless network disassociation time when WPA3 and OWE security protocols are used, and an electronic device supporting the same method.

An electronic device according to various example embodiments of the disclosure may include: a communication circuit, a memory, and at least one processor functionally connected to the communication circuit and the memory, wherein the at least one processor is configured to: control the electronic device to perform wireless communication with an external electronic device, based on a shared secret key generated by the electronic device in a process of configuring an association with the external electronic device, control the communication circuit to transmit, to the external electronic device, a renewal frame for renewing the shared secret key, at a time point at which a lifetime of the shared secret key expires or a time point that is a specified time ahead of the time point at which the lifetime of the shared secret key expires, and renew the shared secret key and perform wireless communication with the external electronic device, based on the renewed shared secret key.

A method for renewing a shared secret key in an electronic device according to various example embodiments of the disclosure may include: performing wireless communication with an external electronic device through a communication circuit of the electronic device, based on a shared secret key generated by the electronic device in a process of configuring an association with the external electronic device, transmitting, to the external electronic device through the communication circuit, a renewal frame for renewing the shared secret key, at a time point at which a lifetime of the shared secret key expires or a time point that is a specified time ahead of the time point at which the lifetime of the shared secret key expires, and renewing the shared secret key and performing wireless communication with the external electronic device through the communication circuit, based on the renewed shared secret key.

A method for renewing a PMK and an electronic device supporting same according to various example embodiments of the disclosure can renew a PMK while minimizing and/or reducing a wireless network disassociation in a situation in which the PMK expires when WPA3 and OWE security protocols are used, thereby maintaining the security of a wireless network and increasing the usability thereof.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
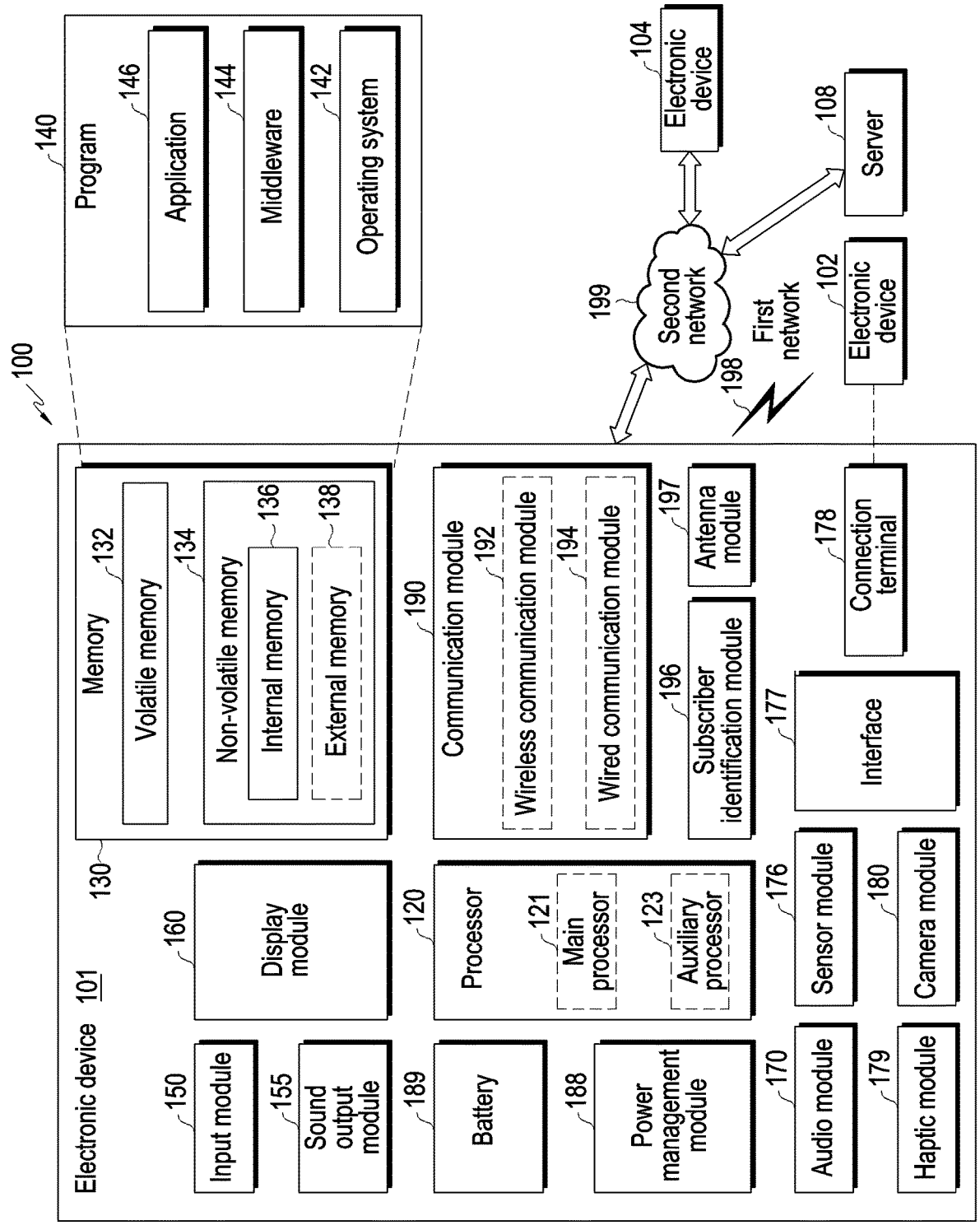
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
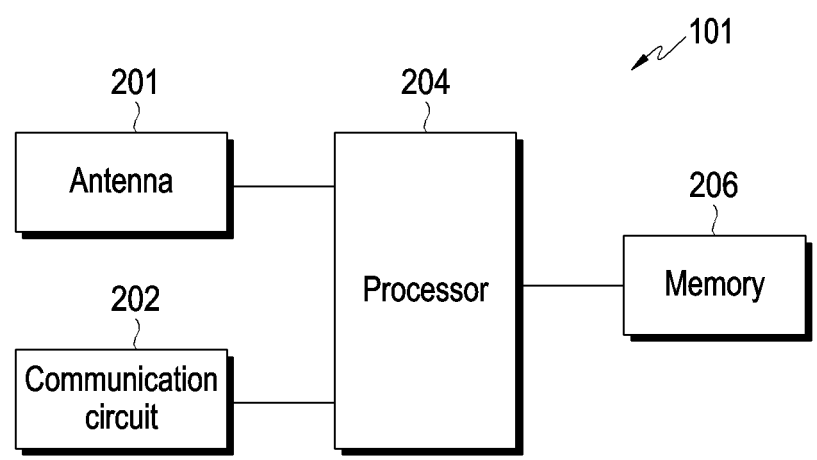
FIG. 2 is a block diagram illustrating an example configuration of an electronic device according to various embodiments.

FIG. 2 is a block diagram illustrating an example configuration of an electronic device 101 according to various embodiments.

Referring to FIG. 2, in an embodiment, the electronic device 101 may include an antenna 201, a communication circuit 202, a processor (e.g., including processing circuitry) 204, and a memory 206.

In an embodiment, at least a part of the antenna 201 or the communication circuit 202 may be implemented as at least a part of the communication module 190 and the antenna module 197 of FIG. 1.

In an embodiment, the communication circuit 202 (e.g., the communication module 190 of FIG. 1) may include a medium access control (MAC) layer and a physical (PHY) layer circuit for transmitting or receiving signals using one or more antennas 201.

In an embodiment, the communication circuit 202 and the processor 204 may process various wireless control functions to communicate with one or more wireless networks according to one or more wireless technologies. In an embodiment, the wireless technologies may include, for example, and without limitation, worldwide interoperability for microwave access (WiMax), Wi-Fi, global system for mobile communications (GMS), enhanced data rates for GSM (EDGE), a GSM EDGE radio access network (GERAN), a universal mobile telecommunication system (UMTS), a universal terrestrial radio access network (UTRAN), 3G, 4G, 5G, beyond-5G, or the like, which has been already developed or may be developed in the future.

In an embodiment, the processor 204 may be included in the processor 120 of FIG. 1. In an embodiment, the processor 204 may include one or more processors.

In an embodiment, the processor 204 may include various processing circuitry and control and perform the overall operation of a method for renewing an authentication key. A detailed description related to the method in which the processor 204 performs the authentication key renewal will be made below.

In an embodiment, the memory 206 may be included in the memory 130 of FIG. 1.

In an embodiment, the memory 206 may store information related to an instruction related to renewing of the authentication key. A detailed description of the information related to the renewing of the authentication key, stored by the memory 206, will be made below.

An electronic device (e.g., the electronic device 101) according to various example embodiments may include a communication circuit (e.g., the communication circuit 202), a memory (e.g., the memory 206), and at least one processor (e.g., the processor 204) functionally connected to the communication circuit (e.g., the communication circuit 202) and the memory (e.g., the memory 206), wherein the at least one processor (e.g., the processor 204) is configured to: perform wireless communication with an external electronic device (e.g., the external electronic device 103) through the communication circuit (e.g., the communication circuit 202), based on a shared secret key generated by the electronic device (e.g., the electronic device 101) in a process of configuring an association with the external electronic device (e.g., the external electronic device 103), transmit, to the external electronic device (e.g., the external electronic device 103) through the communication circuit (e.g., the communication circuit 202), a renewal frame for renewing the shared secret key, at a time point at which a lifetime of the shared secret key expires or a time point that is a specified time ahead of the time point at which the lifetime of the shared secret key expires, and renew the shared secret key to perform wireless communication with the external electronic device (e.g., the external electronic device 103) through the communication circuit (e.g., the communication circuit 202), based on the renewed shared secret key.

In various example embodiments, the renewal frame may correspond to a deauthentication frame which releases an authentication with the external electronic device (e.g., the external electronic device 103), or a disassociation frame which releases an association with the external electronic device (e.g., the external electronic device 103), wherein the deauthentication frame or the disassociation frame includes a vendor-specific content field including information requesting a renewal of the shared secret key from the external electronic device.

In various example embodiments, the renewal frame may correspond to an action frame configured to perform an operation agreed with the external electronic device (e.g., the external electronic device 103) in advance, wherein the action frame includes a vendor-specific content field including information requesting a renewal of the shared secret key from the external electronic device (e.g., the external electronic device 103).

In various example embodiments, the at least one processor (e.g., the processor 204) may be configured to: attempt a reassociation with the external electronic device (e.g., the external electronic device 103) without performing a scan operation for searching for another external electronic device, or attempt a reassociation with the external electronic device (e.g., the external electronic device 103) by performing a part of the scan operation for searching for another external electronic device, at the time point at which the lifetime of the shared secret key expires, or at the time point that is a specified time ahead of the time point at which the lifetime of the shared secret key expires.

In various example embodiments, the at least one processor (e.g., the processor 204) may be configured to, in a process of the association with the external electronic device (e.g., the external electronic device 103), transmit information relating to a first lifetime of the shared secret key, to the external electronic device (e.g., the external electronic device 103) through the communication circuit (e.g., the communication circuit 202), and receive information relating to a second lifetime of the shared secret key generated by the external electronic device (e.g., the external electronic device 103), from the external electronic device (e.g., the external electronic device 103) through the communication circuit.

In various example embodiments, the at least one processor (e.g., the processor 204) may be configured to determine a renewal time of the shared secret key, based on the information relating to the first lifetime and the information relating to the second lifetime, and transmit the renewal frame through the communication circuit, based on the renewal time of the shared secret key.

In various example embodiments, the at least one processor (e.g., the processor 204) may be configured to determine the renewal time of the shared secret key, based on one of the first lifetime and the second lifetime based on the first lifetime having a value identical to that of the second lifetime, and determine the renewal time of the shared secret key, based on a smaller value among the first lifetime and the second lifetime based on the first lifetime having a value different from a value of the second lifetime.

In various example embodiments, the at least one processor (e.g., the processor 204) may be configured to, based on an association process for wireless communication with the external electronic device (e.g., the external electronic device 103), transmit an action frame including information relating to a first lifetime of the shared secret key to the external electronic device (e.g., the external electronic device 103) through the communication circuit, and receive an action frame including information relating to a second lifetime of the shared secret key generated by the external electronic device (e.g., the external electronic device 103), from the external electronic device (e.g., the external electronic device 103) through the communication circuit.

In various example embodiments, the at least one processor (e.g., the processor 204) may be configured to determine a renewal time of the shared secret key, based on the information relating to the first lifetime and the information relating to the second lifetime, and transmit the renewal frame through the communication circuit, based on the renewal time of the shared secret key.

In various example embodiments, the at least one processor (e.g., the processor 204) may be configured to determine the renewal time of the shared secret key, based on one of the first lifetime and the second lifetime based on the first lifetime having a value identical to that of the second lifetime, and determine the renewal time of the shared secret key, based on a smaller value among the first lifetime and the second lifetime based on the first lifetime having a value different from a value of the second lifetime.

Figure 3:
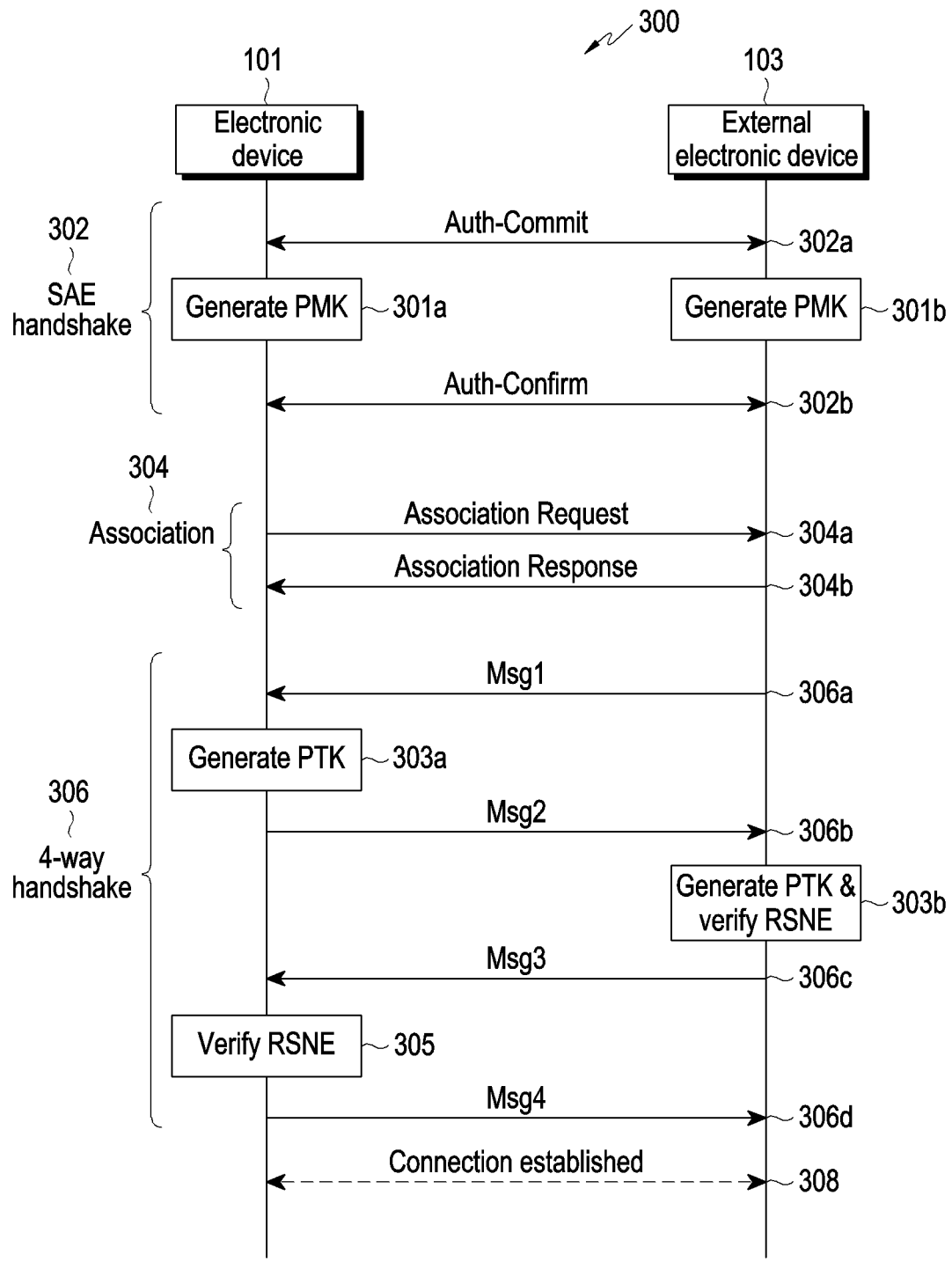
FIG. 3 is a signal flow diagram illustrating an example authentication procedure of an electronic device using WPA3 according to various embodiments.

FIG. 3 is a signal flow diagram illustrating an example authentication procedure 300 of an electronic device using WPA3 according to various embodiments.

Referring to FIG. 3, in operation 302, an electronic device 101 may perform an authentication procedure through a simultaneous authentication of equals (SAE) handshake for communication with an external electronic device 103 (e.g., an access point (AP)). For example, in operation 302*a*, the electronic device 101 may transmit or receive an Auth-Commit message to or from the external electronic device 103. In an embodiment, the electronic device 101 may transmit an Auth-Commit request message to the external electronic device 103, and in response thereto, receive an Auth-Commit response message from the external electronic device 103, and in this process, may exchange a key required for authentication with the external electronic device 103. In operation 301*a*, the electronic device 101 may generate a PMK using the key exchanged with the external electronic device 103. In operation 301*b*, the external electronic device 103 may generate a PMK using the key exchanged with the electronic device 101 in the process of performing the authentication procedure in operation 302. In operation 302*b*, the electronic device 101 may transmit or receive an Auth-Confirm message informing of completion of the authentication to or from the external electronic device 103.

In operation 304, the electronic device 101 may perform an association procedure with the external electronic device 103. For example, the electronic device 101 may transmit, in operation 304*a*, an association request message to the external electronic device 103, and may receive, in operation 304*b*, an association response message from the external electronic device 103.

In operation 306, the electronic device 101 may perform a 4-way handshake procedure with the external electronic device 103. For example, in operation 306*a*, the electronic device 101 may receive message (Msg) 1 from the external electronic device 103. Msg 1 may include an authentication nonce randomly generated by the external electronic device 103. In operation 303*a*, the electronic device 101 may generate a supplicant nonce, and may generate a PTK using the supplicant nonce, the authenticator nonce included in Msg 1, and the PMK generated in operation 301*a*. In operation 306*b*, the electronic device 101 may transmit Msg 2 including the supplicant nonce generated by the electronic device 101 itself, to the external electronic device 103. In an embodiment, Msg 2 may further include a message integrity code (MIC) and a robust security network element (RSNE). The external electronic device 103 having received Msg 2 may generate a PTK in operation 303b, verify the RSNE using the generated PTK and the MIC received through Msg 2, and then transmit Msg 3 to the electronic device 101 in operation 306c. Msg 3 may include the authentication nonce and the RSNE. In operation 305, the electronic device 101 may verify the RSNE received through Msg 3. The electronic device 101 may transmit, in operation 306d, Msg 4 including the MIC to the external electronic device 103, and an association between the electronic device 101 and the external electronic device 103 may be established in operation 308.

Figure 4:
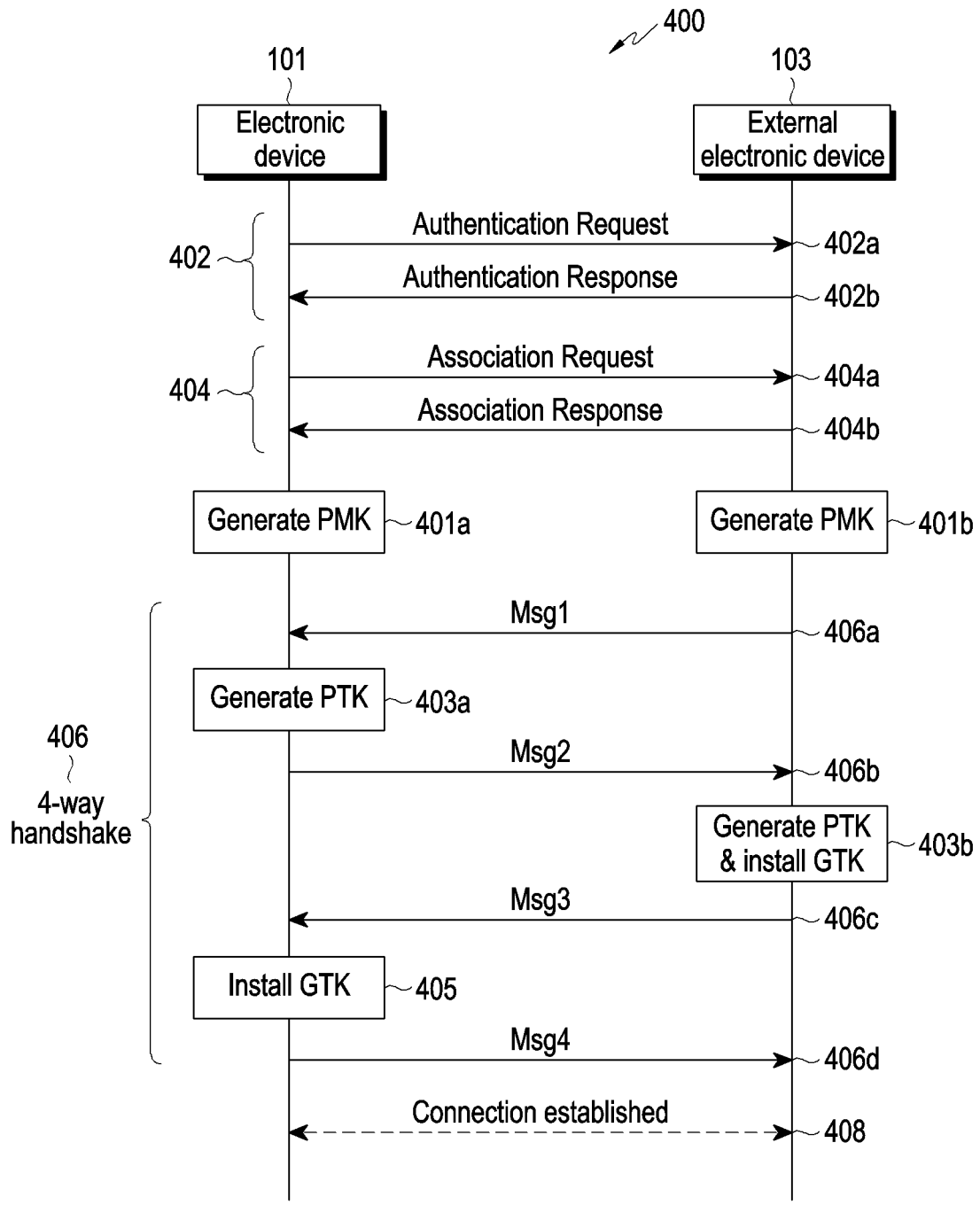
FIG. 4 is a signal flow diagram illustrating an example authentication procedure of an electronic device using OWE according to various embodiments.

FIG. 4 is a signal flow diagram illustrating an example authentication procedure 400 of an electronic device using OWE according to various embodiments.

Referring to FIG. 4, in operation 402, an electronic device 101 may perform an authentication procedure through transmission or reception of an authentication request message and an authentication response message to or from the external electronic device 103. For example, the electronic device 101 may transmit, in operation 402a, the authentication request message to the external electronic device 103, and receive, in operation 402b, the authentication response message from the external electronic device 103, and in this process, may exchange a key required for authentication with the external electronic device 103.

In operation 404, the electronic device 101 may perform an association procedure through transmission or reception of an association request message and an association response message to or from the external electronic device 103. For example, the electronic device 101 may transmit, in operation 404a, the association request message to the external electronic device 103, and receive, in operation 404b, the association response message from the electronic device 103, and in the process, may exchange a key required for authentication with the external electronic device 103. In operation 401a, the electronic device 101 may generate a PMK using the key exchanged with the external electronic device 103. In operation 401b, the external electronic device 103 may also generate a PMK using the key exchanged with the electronic device 101.

In operation 406, the electronic device 101 may perform a 4-way handshake procedure with the external electronic device 103. For example, in operation 406a, the electronic device 101 may receive message (Msg) 1 from the external electronic device 103. Msg 1 may include an authenticator nonce randomly generated by the external electronic device 103. In operation 403a, the electronic device 101 may generate a supplicant nonce, and generate a PTK using the supplicant nonce, the authenticator nonce included in Msg 1, and the PMK generated in operation 401a. In operation 406b, the electronic device 101 may transmit Msg 2 including the supplicant nonce generated by the electronic device 101 itself to the external electronic device 103. In an embodiment, Msg 2 may further include a message integrity code (MIC) and a robust security network element (RSNE). In operation 403b, the external electronic device 103 having received Msg 2 may generate a PTK using the PMK generated in operation 401b, and install a group temporal key (GTK). The external electronic device 103 may generate the PTK, install the GTK, and then transmit Msg 3 to the electronic device 101 in operation 406c. Msg 3 may include the authenticator nonce, the RSNE, and the GTK. In operation 405, the electronic device 101 may install the GTK. The electronic device 101 may transmit, in operation 406d, Msg 4 including the MIC to the external electronic device 103, and an association between the electronic device 101 and the external electronic device 103 may be established in operation 408.

Figure 5:
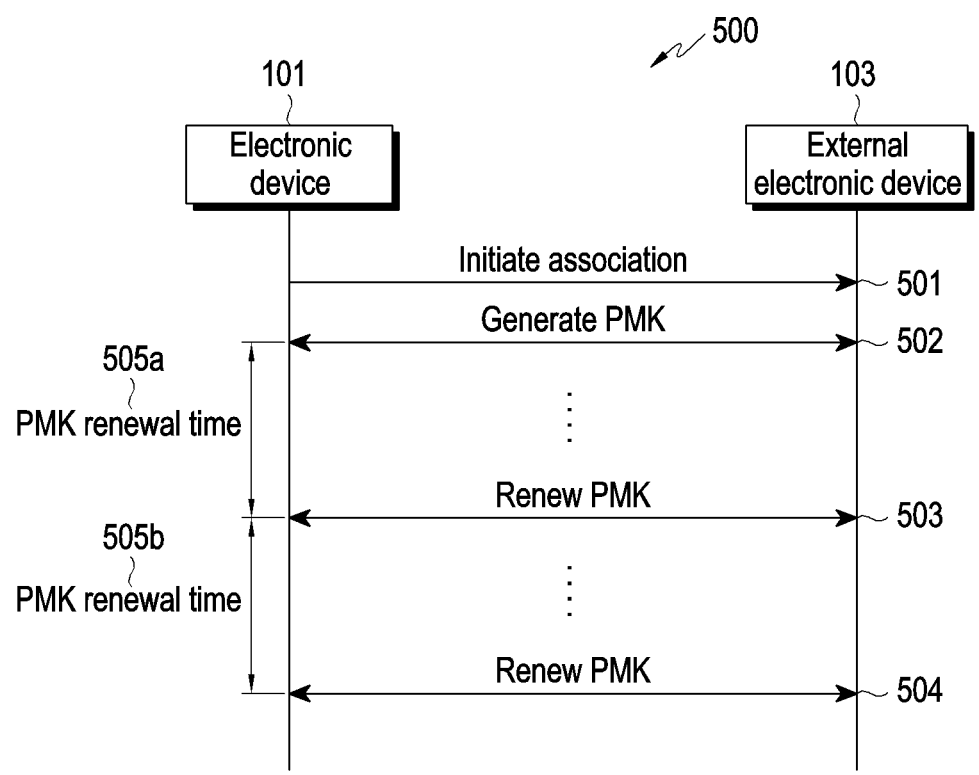
FIG. 5 is a signal flow diagram illustrating an example PMK renewal procedure of an electronic device according to various embodiments.

FIG. 5 is a signal flow diagram illustrating an example PMK renewal procedure 500 of an electronic device according to various embodiments.

Referring to FIG. 5, in operation 501, the electronic device 101 may initiate an association with the external electronic device 103. Each of the electronic device 101 and the external electronic device 103 may generate a PMK in operation 502. The generating of the PMK by each of the electronic device 101 and the external electronic device 103 in operation 502 in FIG. 5 may correspond to operations 301a and 301b in FIG. 3 and operations 401a and 401b in FIG. 4.

When one PMK is used for a predetermined time or longer, a security problem may occur, and to prevent and/or avoid the problem, the electronic device 101 and/or the external electronic device 103 may configure a PMK renewal time for a renewal of the PMK. The generated PMK expires once a configured PMK renewal time 505a passes after the PMK is generated, and the electronic device 101 may renew the PMK with the external electronic device 103 in operation 503. The renewal of the PMK may correspond to operations 301a and 301b in FIG. 3 and operations 401a and 401b in FIG. 4.

The PMK renewed in operation 503 also expires once a PMK renewal time 505b passes, and the electronic device 101 may renew the PMK again in operation 504. The renewal of the PMK again may correspond to operations 301a and 301b in FIG. 3 or operations 401a and 401b in FIG. 4.

Each of the PMK renewal times 505a and 505b may have a smaller value among a PMK lifetime of the electronic device 101 and a PMK lifetime of the external electronic device 103, and when the PMK lifetime of one of the electronic device 101 and the external electronic device 103 expires, the renewal of the PMK may be performed. In an embodiment, when the PMK lifetime of the electronic device 101 and the PMK lifetime of the external electronic device 103 have the same value, each of the PMK renewal times 505a and 505b may be configured with a value of one of the PMK lifetime of the electronic device 101 and the PMK lifetime of the external electronic device 103.

In the process of renewing the PMK in operation 503 once the PMK generated in operation 502 in FIG. 5 expires, the electronic device 101 and the external electronic device 103 may be disassociated from each other, and the electronic device 101 may not be able to renew the PMK if not performing, in operations 503 and 504 for renewal of the PMK, operations 301a and 301b in FIG. 3 or operations 401 and 401b in FIG. 4.

In an embodiment, in operations 301a and 301b in FIG. 3 or operations 401a and 401b in FIG. 4, an entity (e.g., the electronic device 101 (e.g., a terminal)) for transmitting a request message and an entity (e.g., the external electronic device 103 (e.g., an AP)) for responding to the request message may be fixed. The electronic device 101 may transmit a frame for renewing the PMK to the external electronic device 103, and the electronic device 101 and the external electronic device 103 may be disassociated from each other for the renewal of the PMK. In order for the electronic device 101 to complete a reassociation with the external electronic device 103, it may take about 5 seconds to 30 seconds to search for the external electronic device 103 again, and the user may recognize the dissociation time as a malfunction in a wireless network.

Hereinafter, various example embodiments disclose a method for reducing a time taken the PMK is renewed after the lifetime of the PMK expires.

Figure 6:
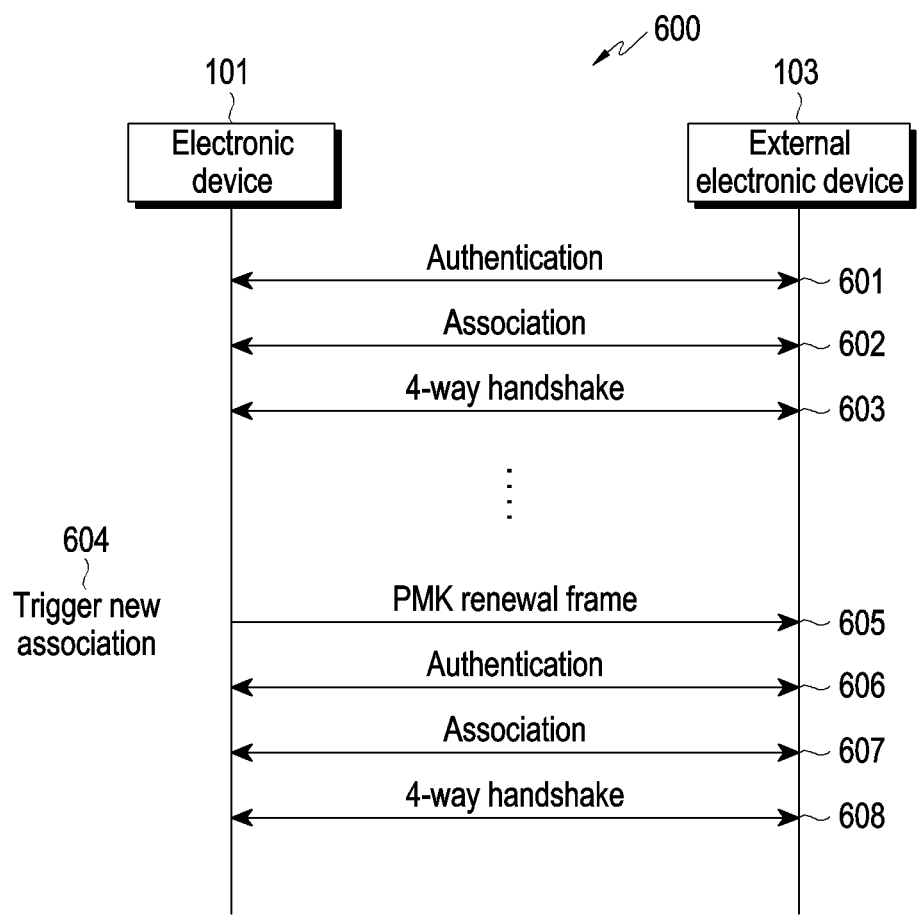
FIG. 6 is a signal flow diagram illustrating an example PMK renewal procedure of an electronic device according to various embodiments.

FIG. 6 is a signal flow diagram illustrating an example PMK renewal procedure 600 of an electronic device according to various embodiments.

Referring to FIG. 6, in operations 601 to 603, the electronic device 101 and the external electronic device 103 may perform the same operations as operations 302, 304, and 306 in FIG. 3, and generate a PMK in the process of performing the operations.

When a lifetime of the generated PMK has expired or is expected to expire, the electronic device 101 may trigger, in operation 604, a new association at a time point at which the lifetime of the generated PMK expires or a time point that is a predetermined time ahead of the time point at which the lifetime of the generated PMK expires, and may transmit a PMK renewal frame to the external electronic device 103 in operation 605.

After the PMK renewal frame is transmitted, the electronic device 101 and the external electronic device 103 may perform, in operations 606, 607, and 608, the same or similar operations as operations 601, 602, and 603, and renew the PMK in the process of performing the operations.

Figure 7:
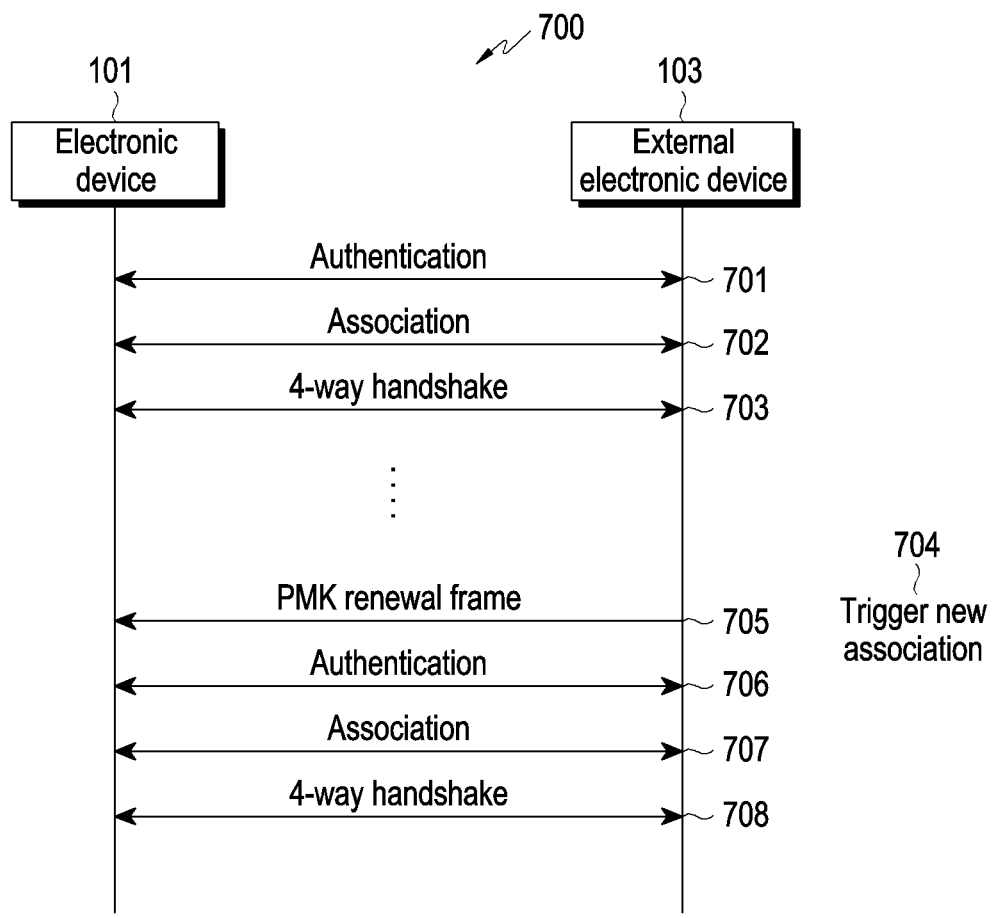
FIG. 7 is a signal flow diagram illustrating an example PMK renewal procedure of an electronic device according to various embodiments.

FIG. 7 is a signal flow diagram illustrating an example PMK renewal procedure 700 of an electronic device according to various embodiments.

Referring to FIG. 7, in operations 701 to 703, the electronic device 101 and the external electronic device 103 may perform the same or similar operations as operations 302, 304, and 306 in FIG. 3, and generate a PMK in the process of performing the operations.

When a lifetime of the generated PMK has expired or is expected to expire, the external electronic device 103 may trigger, in operation 704, a new association at a time point at which the lifetime of the generated PMK expires or a time point that is a predetermined time ahead of the time point at which the lifetime of the generated PMK expires, and may transmit a PMK renewal frame to the electronic device 101 in operation 705.

In operation 705, after the PMK renewal frame is transmitted, the electronic device 101 and the external electronic device 103 may perform, in operations 706 to 708, the same or similar operations as operations 701 to 703, and renew the PMK in the process of performing the operations.

Figure 8:
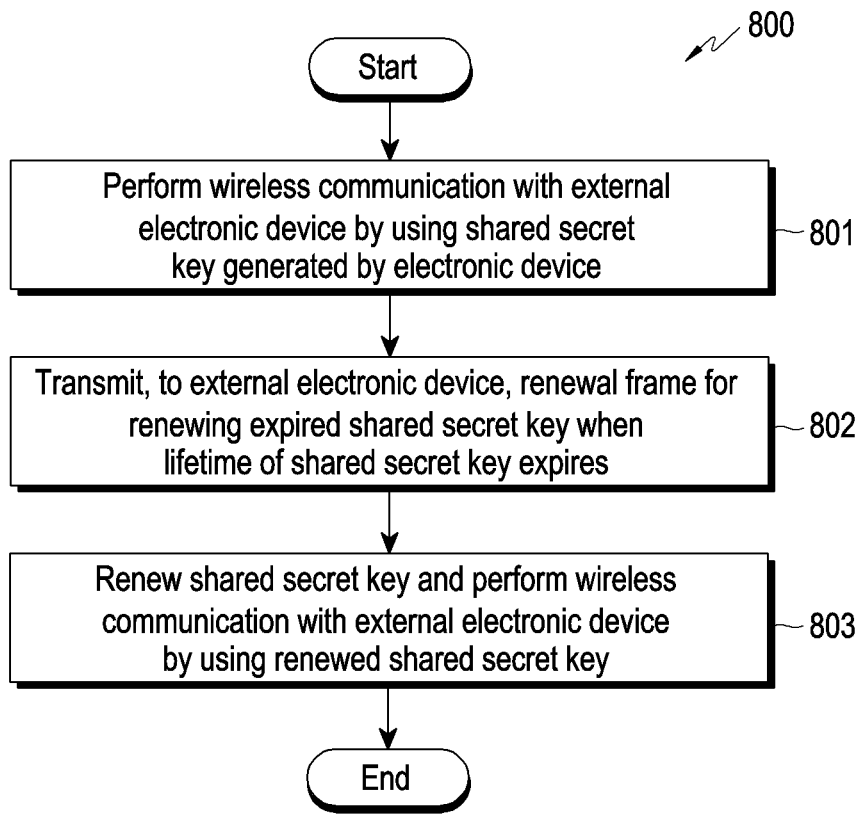
FIG. 8 is a flowchart illustrating an example PMK renewal procedure of an electronic device according to various embodiments.

FIG. 8 is a flowchart 800 illustrating an example PMK renewal procedure of an electronic device according to various embodiments.

Referring to FIG. 8, in operation 801, a processor 204 of an electronic device 101 may perform wireless communication with an external electronic device 103 through a communication circuit 202 using a PMK corresponding to a shared secret key generated in a process of authentication and association with the external electronic device 103.

In operation 802, the processor 204 of the electronic device 101 may identify whether a lifetime of a generated PMK has expired, and when it is identified that the PMK lifetime has expired or is expected to expire, the processor 204 may transmit a PMK renewal frame for the renewal of the PMK to the external electronic device 103 through the communication circuit 202 at a time point at which the lifetime of the generated PMK expires or at a time point that is a predetermined time ahead of the time point at which the lifetime of the generated PMK expires.

Based on the PMK renewal frame being transmitted, processor 204 of the electronic device 101 may renew the PMK in operation 803, and may perform wireless communication with the external electronic device 103, based on the renewed PMK.

When the PMK lifetime has not expired or is not expected to expire, the processor 204 of the electronic device 101 may maintain the association with the external electronic device 103 until a time point at which expiration of the PMK lifetime is expected.

In FIG. 8, it is described that the PMK of the electronic device 101 expires, but according to an embodiment, as shown in FIG. 7, the PMK of the external electronic device 103 may expire earlier than the PMK of the electronic device 101. For example, when the PMK of the external electronic device 103 expires first, the external electronic device 103 may transmit the PMK renewal frame to the electronic device 101. In addition, in FIG. 8, it is described that the processor 204 of the electronic device 101 perform the operations, but according to an embodiment, the communication circuit 202 of the electronic device 101 may perform the operations in FIG. 8.

In an embodiment, as a PMK renewal frame, a vendor-specific action frame defined in the 802.11 standard of the Institute of Electrical and Electronics Engineers (IEEE) may be used. The vendor-specific action frame may be a frame used when defining a random operation that is not defined in a protocol.

Figure 9:
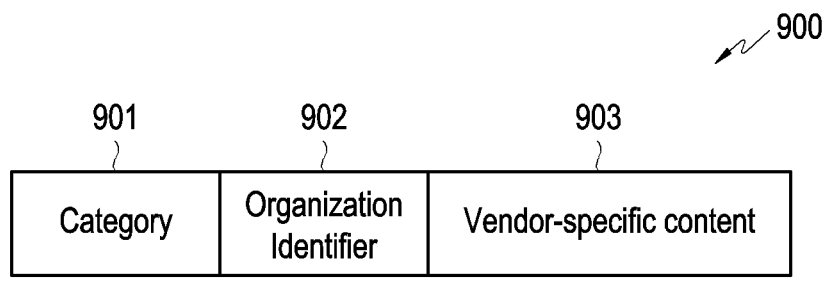
FIG. 9 is a diagram illustrating an example structure of a PMK renewal frame used for a PMK renewal procedure of an electronic device according to various embodiments.

FIG. 9 is a diagram illustrating an example structure of a vendor-specific action frame used for a PMK renewal procedure of an electronic device according to various embodiments.

Referring to FIG. 9, a vendor-specific action frame 900 for a renewal of a PMK may be configured to include a category 901, an organization ID 902, and a vendor-specific content 903. The length of the vendor-specific content 903 may be variable, and include information requesting the renewal of the PMK.

When the vendor-specific action frame is used as the PMK renewal frame, the electronic device 101 and the external electronic device 103 may be implemented to interpret the vendor-specific content 903 included in the vendor-specific action frame.

Figure 10:
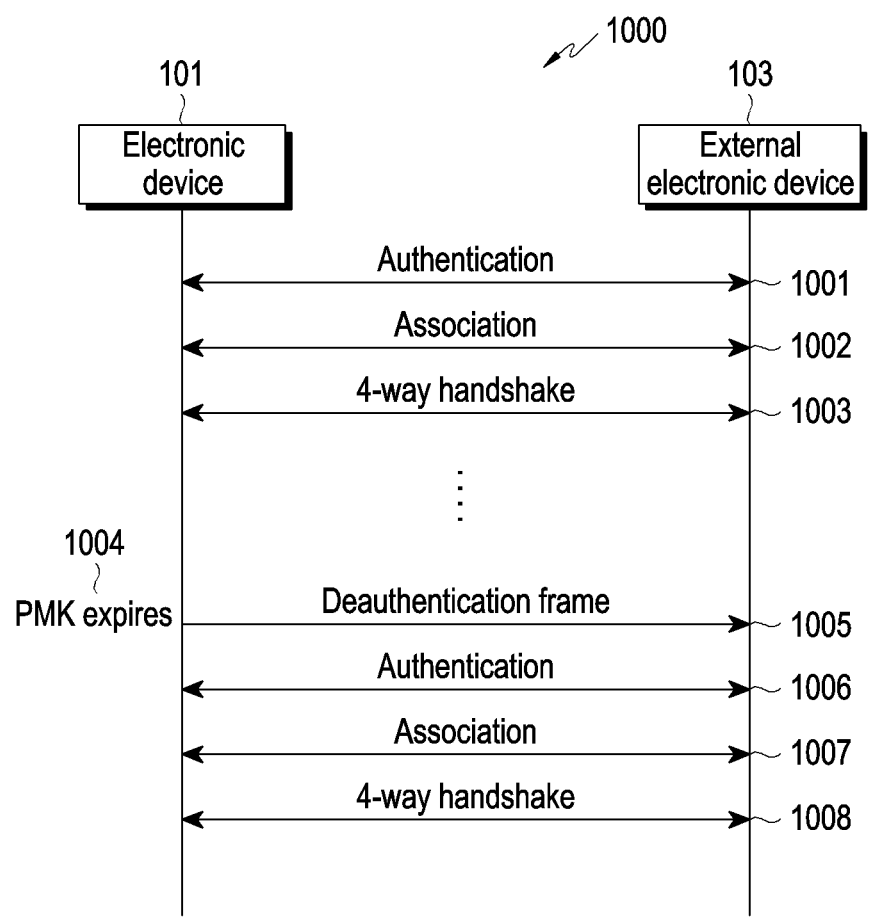
FIG. 10 is a signal flow diagram illustrating an example PMK renewal procedure of an electronic device according to various embodiments.

FIG. 10 is a signal flow diagram illustrating an example PMK renewal procedure 1000 of an electronic device according to various embodiments.

Referring to FIG. 10, in operations 1001 to 1003, an electronic device 101 and an external electronic device 103 may perform the same or similar operations as operations 601 to 603 in FIG. 6, and generate a PMK in the process of performing the operations.

In operation 1004, the electronic device 101 may identify that a lifetime of the generated PMK has expired or is expected to expire. The electronic device 101 may transmit, in operation 1005, a deauthentication frame to the external electronic device 103 for a renewal of the PMK, the lifetime of which has expired or is to expire. In an embodiment, FIG. 10 illustrates the deauthentication frame, but a disassociation frame may be transmitted instead of the deauthentication frame.

Based on the deauthentication frame or the disassociation frame being transmitted, the electronic device 101 and the external electronic device 103 may perform, in operations 1006 to 1008, the same or similar operations as operations 1001 to 1003, and may renew the PMK in the process of performing the operations.

According to an embodiment, in operation 1005, the transmitting of the deauthentication frame or the disassociation frame to the external electronic device 103 by the electronic device 101 may be omitted, and in this case, when it is identified in operation 1004 that the lifetime of the PMK has expired or is to expire, the electronic device 101 may attempt a reassociation with the external electronic device 103 and perform operations 1006 to 1008 to renew the PMK, without transmitting the deauthentication frame or the disassociation frame to the external electronic device 103. Through the operation above, the electronic device 101 may skip scanning multiple external electronic devices including the external electronic device 103 or scan some of the multiple external electronic devices, and then attempt a reassociation with the previously associated external electronic device 103.

Figure 11:
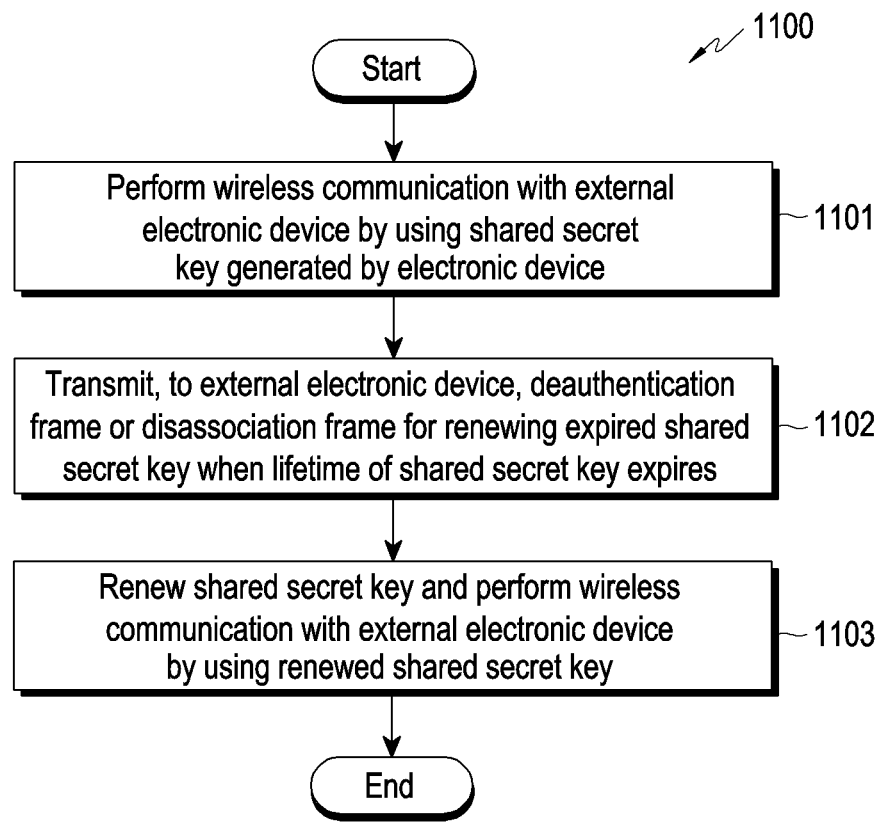
FIG. 11 is a flowchart illustrating an example PMK renewal procedure of an electronic device according to various embodiments.

FIG. 11 is a flowchart 1100 illustrating an example PMK renewal procedure of an electronic device according to various embodiments.

Referring to FIG. 11, in operation 1101, an electronic device 101 may perform wireless communication with an external electronic device 103 using a PMK corresponding to a shared secret key generated in a process of authentication and association with the external electronic device 103.

In operation 1102, a processor 204 of the electronic device 101 may identify whether a lifetime of a generated PMK has expired, and when it is identified that the PMK lifetime has expired or is expected to expire, the processor 204 of the electronic device 101 may transmit a deauthentication frame or a disassociation frame to the external electronic device 103 for a renewal of the PMK, the lifetime of which has expired or is expected to expire, at a time point at which the lifetime of the PMK expires or at a time point that is a predetermined time ahead of the time point at the lifetime of the PMK expires.

Based on the deauthentication frame or the disassociation frame being transmitted, the processor 204 of the electronic device 101 may renew the PMK, the lifetime of which has expired or is to expire, and perform wireless communication with the external electronic device 103 using the renewed unique secret key in operation 1103.

When the PMK lifetime has not expired or is not expected to expire, the processor 204 of the electronic device 101 may maintain the association with the external electronic device 103 until a time point at which expiration of the PMK lifetime is expected.

According to an embodiment, the transmitting of the deauthentication frame or the disassociation frame to the external electronic device 103 by the electronic device 101 in operation 1103 may be omitted, and in this case, when it is identified the lifetime of the PMK has expired or is to expire, the processor 204 of the electronic device 101 may attempt a reassociation with the external electronic device 103 and renew the PMK at the time point at which the expiration of the lifetime of the PMK is expected or at the time point that is a predetermined time ahead of the time point at the lifetime of the PMK expires, without transmitting the deauthentication frame or the disassociation frame to the external electronic device 103. Through the operation above, the electronic device 101 may skip scanning multiple external electronic devices including the external electronic device 103 or scan some of the multiple external electronic devices, and then attempt a reassociation with the previously associated external electronic device 103.

In an embodiment, when a deauthentication frame or a disassociation frame is used for a renewal of a PMK, a vendor-specific content may be added to the deauthentication frame or the disassociation frame defined in the IEEE 802.11, and used.

The deauthentication frame or the disassociation frame, as a management frame, may be transmitted when communication ends. The vendor-specific content of the deauthentication frame or the disassociation frame may be configured to include a predetermined (specified) value desired by a manufacturer of each electronic device, and information requesting a PMK renewal may be included thereto according to an embodiment.

Figure 12:
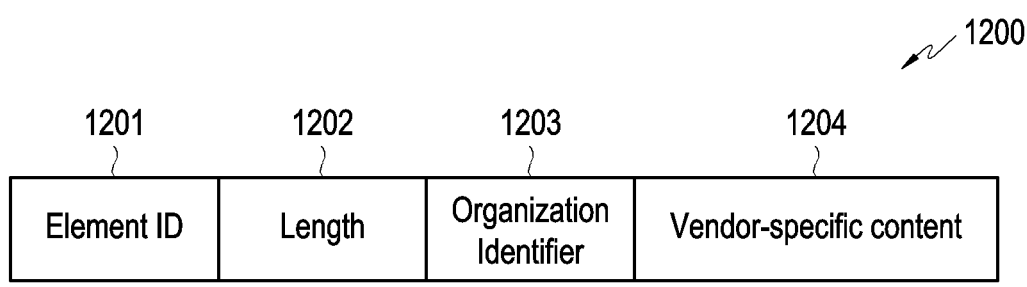
FIG. 12 is a diagram illustrating an example structure of a vendor-specific action frame used for a PMK renewal procedure of an electronic device according to various embodiments.

FIG. 12 is a diagram illustrating an example structure of a deauthentication frame or a disassociation frame used for a PMK renewal procedure of an electronic device according to various embodiments.

Referring to FIG. 12, a deauthentication frame or a disassociation frame 1200 may be configured to include an element ID 1201, the length 1202, an organization ID 1203, and a vendor-specific content 1204. The length of the vendor-specific content 1204 may be variable, and include information requesting the renewal of the PMK.

In an embodiment, as shown in FIGS. 10 and 11, when the external electronic device 103 is not implemented to transmit or receive the deauthentication frame or the disassociation frame, the electronic device 101 may transmit the deauthentication frame or the disassociation frame to which no vendor-specific content is added, to the external electronic device 103 to renew the PMK, so as to inform the external electronic device 103 of the expiration of the PMK. The electronic device 101 may attempt a reassociation with the external electronic device 103 without transmitting the deauthentication frame or the disassociation frame. According to an embodiment, the electronic device 101 may configure a specific bit with a specific value for a vendor-specific information element such as a beacon, a probe response, and an association response frame while performing a communication association with the external electronic device 103, so as to identify whether the external electronic device 103 can transmit or receive the PMK renewal frame.

In an embodiment, the electronic device 101 may agree to a PMK renewal time point with the external electronic device 103 in advance and renew the PMK at the agreed time point. To this end, the electronic device 101 may exchange PMK lifetime information with the external electronic device 103 when performing an association procedure with the external electronic device 103.

Figure 13:
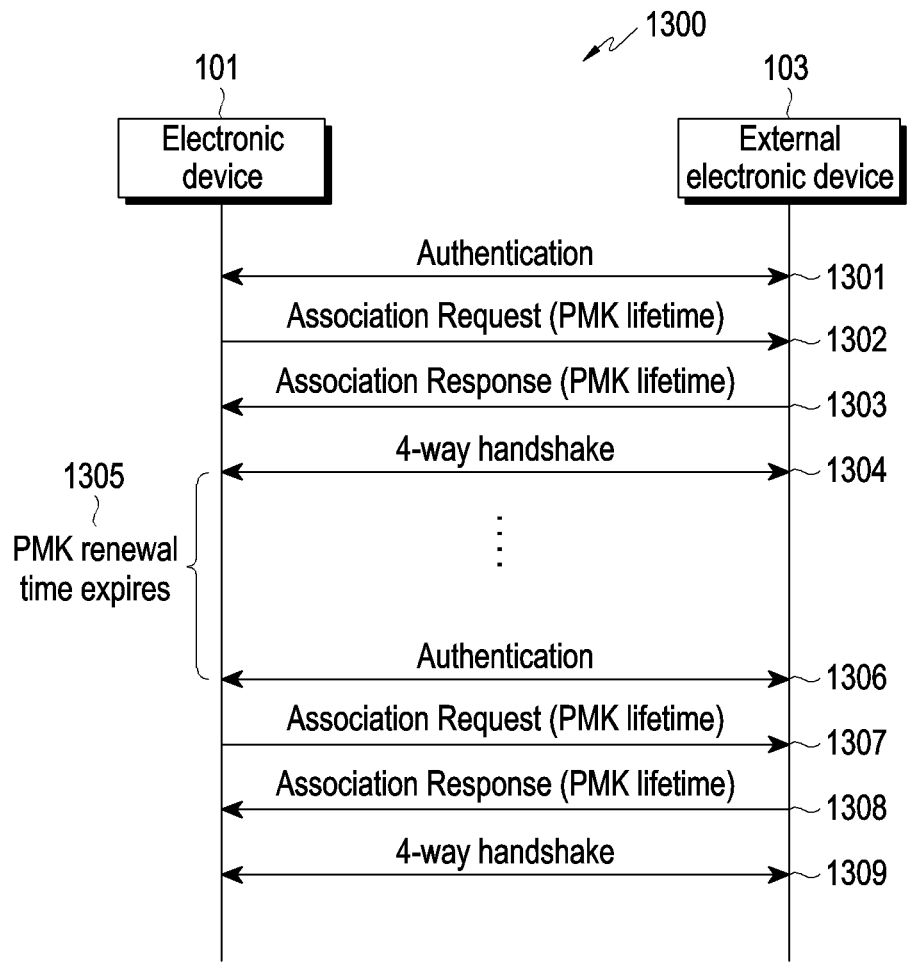
FIG. 13 is a signal flow diagram illustrating an example PMK renewal procedure of an electronic device according to a wireless communication technology according to various embodiments.

FIG. 13 is a signal flow diagram illustrating an example PMK renewal procedure 1300 of an electronic device according to a wireless communication technology according to various embodiments.

Referring to FIG. 13, in operations 1301 to 1304, the electronic device 101 and the external electronic device 103 may perform the same or similar operations as operations 601 to 603 in FIG. 6, and the electronic device 101 and the external electronic device 103 may generate a PMK in the process of performing the operations.

In operation 1302, the electronic device 101 may transmit an association request to the external electronic device 103, wherein the association request may include PMK lifetime information of the electronic device 101 as a vendor-specific information element. According to an embodiment, the PMK lifetime of the electronic device 101 may be configured by an authentication program (supplicant) in the electronic device 101.

In operation 1303, the electronic device 101 may receive an association response from the external electronic device 103, wherein the association response may include PMK lifetime information of the external electronic device 103 as a vendor-specific information element. According to an embodiment, the PMK lifetime of the external electronic device 103 may be configured by a network manager.

According to an embodiment, a PMK renewal time may be configured based on the PMK lifetime information of the electronic device 101 and the PMK lifetime information of the external electronic device 103. For example, a PMK lifetime of the electronic device 101 and a PMK lifetime of the external electronic device 103 may have the same value or different values, wherein the PMK is managed such that the PMKs of the electronic device 101 and the external electronic device 103 have the same value, and thus, the PMK may be renewed when the PMK lifetime of one of the electronic device 101 and the external electronic device 103 has expired or is expected to expire.

According to an embodiment, the PMK renewal time may be configured with a smaller value among the PMK lifetime of the electronic device 101 and the PMK lifetime of the external electronic device 103. For example, the electronic device 101 compares the PMK lifetime information of the electronic device 101 with the PMK lifetime information of the external electronic device 103 to configure the PMK renewal time with a smaller value, and the external electronic device 103 compares the PMK lifetime information of the external electronic device 103 with the PMK lifetime information of the electronic device 101 to configure the PMK renewal time with a smaller value, and thus, the PMK renewal time of the electronic device 101 and the PMK renewal time of the external electronic device 103 may be configured with the same value. In an embodiment, when the PMK lifetime of the electronic device 101 has the same value as the PMK lifetime of the external electronic device 103, the PMK renewal time may be configured with a value of one of the PMK lifetime of the electronic device 101 and the PMK lifetime of the external electronic device 103.

In operation 1305, when the configured PMK renewal time has expired or is expected to expire, the electronic device 101 and the external electronic device 103 may perform, in operations 1306 to 1309, the same or similar operations as operations 1301 to 1304 at a time point at which the PMK lifetime expires or at a time point that is a predetermined time ahead of the time point at which the PMK lifetime expires, and in this process, may renew the PMK which has expired or is to expire.

In operation 1307, the electronic device 101 may transmit an association request to the external electronic device 103, wherein the association request may include the renewed PMK lifetime information of the electronic device 101 as a vendor-specific information element.

In operation 1308, the electronic device 101 may receive an association response from the external electronic device 103, wherein the association response may include the renewed PMK lifetime information of the external electronic device 103 as a vendor-specific information element.

A PMK renewal time may be reconfigured based on the renewed PMK lifetime information of the electronic device 101 and the renewed PMK lifetime information of the external electronic device 103. The renewed PMK lifetime of the electronic device 101 and the renewed PMK lifetime of the external electronic device 103 may have the same value or different values, wherein the PMK is managed such that the PMKs of the electronic device 101 and the external electronic device 103 have the same value, and thus, the PMK may be renewed again when the renewed PMK lifetime of one of the electronic device 101 and the external electronic device 103 has expired or is expected to expire.

According to an embodiment, the PMK renewal time may be configured with a smaller value among the renewed PMK lifetime of the electronic device 101 and the renewed PMK lifetime of the external electronic device 103. For example, the electronic device 101 compares the renewed PMK lifetime information of the electronic device 101 with the renewed PMK lifetime information of the external electronic device 103 to configure with the PMK renewal time with a smaller value, and the external electronic device 103 compares the renewed PMK lifetime information of the external electronic device 103 with the renewed PMK lifetime information of the electronic device 101 to configure the PMK renewal time with a smaller value, and thus, the PMK renewal time of the electronic device 101 and the PMK renewal time of the external electronic device 103 may be configured with the same value. In an embodiment, when the PMK lifetime of the electronic device 101 has the same value as the PMK lifetime of the external electronic device 103, the PMK renewal time may be configured with a value of one of the PMK lifetime of the electronic device 101 and the PMK lifetime of the external electronic device 103.

When the PMK renewal time expires, operations 1306 to 1309 may be repeatedly performed. According to an embodiment, the PMK lifetime of the electronic device 101 or the external electronic device 103 may have a fixed value, and the PMK lifetime may not be transmitted in operations 1307 and 1308 in FIG. 13 when the PMK lifetime has a fixed value.

As shown in FIG. 13, when the association request and the association response are used for the renewal of the PMK, the electronic device 101 and the external electronic device 103 may be implemented to interpret a vendor-specific information element included in the association request and the association response.

Figure 14:
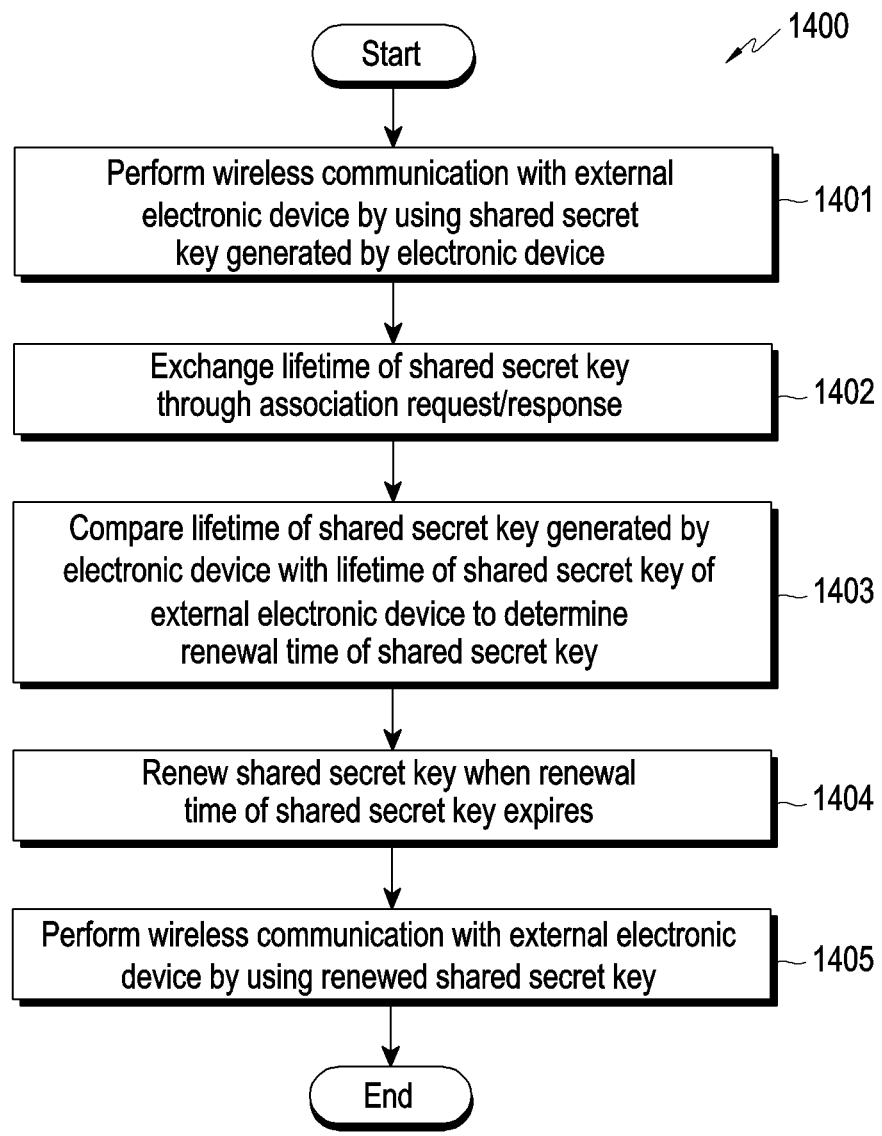
FIG. 14 is a flowchart illustrating an example PMK renewal procedure of an electronic device according to various embodiments.

FIG. 14 is a flowchart 1400 illustrating an example shared secret key renewal procedure of an electronic device according to various embodiments.

Referring to FIG. 14, in operation 1401, a processor 204 of an electronic device 101 may perform wireless communication with an external electronic device 103 through a communication circuit 202 using a shared secret key (e.g., a PMK) generated in the process of authentication and association with the external electronic device 103.

In operation 1402, the processor 204 of the electronic device 101 may exchange information on a lifetime of a shared secret key (e.g., a PMK lifetime) with the external electronic device 103 through transmission of an association request to the external electronic device 103 and reception of an association response from the external electronic device 103. The association request may include the lifetime information of the shared secret key of the electronic device 101 as a vendor-specific information element, and the association response may include the lifetime information of the shared secret key of the external electronic device 103 as a vendor-specific information element.

In operation 1403, the processor 204 of the electronic device 101 may configure a renewal time of the shared secret key, based on the lifetime information of the shared secret key of the electronic device 101 and the lifetime information of the shared secret key of the external electronic device 103, exchanged in operation 1402. The lifetime information of the shared secret key of the electronic device 101 and the lifetime information of the shared secret key of the external electronic device 103 may have the same value or different values, wherein the shared secret key is managed such that the shared secret keys of the electronic device 101 and the external electronic device 103 may have the same value, and thus, the shared secret key may be renewed when a lifetime of a shared secret key of one of the electronic device 101 and the external electronic device 103 has expired or is expected to expire. The processor 204 of the electronic device 101 may configure a renewal time of the shared secret key with a smaller value among the lifetime of the shared secret key of the electronic device 101 and the lifetime of the shared secret key of the external electronic device 103. In an embodiment, when the lifetime of the shared secret key of the electronic device 101 and the lifetime of the shared secret key of the external electronic device 103 have the same value, the renewal time of the shared secret key may be configured with a value of one of the lifetime of the shared secret key of the electronic device 101 and the lifetime of the shared secret key of the external electronic device 103.

In operation 1404, the processor 204 of the electronic device 101 may identify whether the configured renewal time of the shared secret key has expired, and when it is identified that the renewal time of the shared secret key has expired or is expected to expire, the processor 204 of the electronic device 101 may renew the shared secret key at a time point at which the lifetime of the shared secret key expires or at a time point that is a predetermined time ahead of the time point at which the lifetime of the shared secret key expires. In this case, the processor 204 of the electronic device 101 may transmit a shared secret key renewal frame, a deauthentication frame, a disassociation frame, or a vendor-specific action frame to the external electronic device 103.

In operation 1405, the processor 204 of the electronic device 101 may perform wireless communication with the external electronic device 103 through a communication circuit 202 using the renewed PMK.

In operation 1404, when the renewal time of the shared secret key has not expired or is not expected to expire within a predetermined time, the processor 204 of the electronic device 101 may maintain the association with the external electronic device 103 until a time point at which expiration of the renewal time of the shared secret key is expected.

Figure 15:
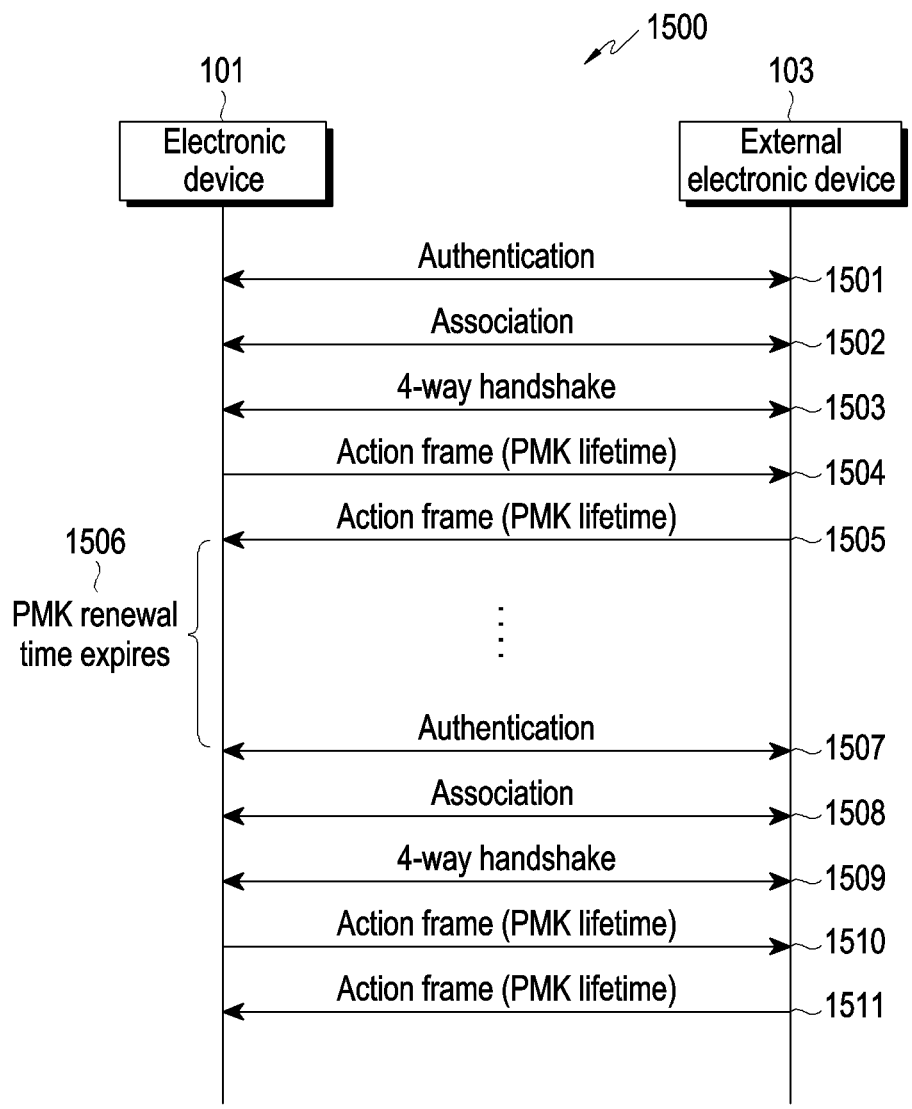
FIG. 15 is a signal flow diagram illustrating an example PMK renewal procedure of an electronic device according to a wireless communication technology according to various embodiments.

FIG. 15 is a signal flow diagram illustrating an example procedure 1500 of a renewal of a PMK corresponding to a shared secret key of an electronic device according to a wireless communication technology according to various embodiments.

Referring to FIG. 15, in operations 1501 to 1503, an electronic device 101 and an external electronic device 103 may perform the same or similar operations as operations 1001 to 1003 in FIG. 10, and generate a PMK in the process of performing the operations.

In operation 1504, the electronic device 101 may transmit an action frame to the external electronic device 103, wherein, in an embodiment, the transmitted action frame may include a vendor-specific content as a vendor-specific action frame, and the vendor-specific content may include PMK lifetime information of the electronic device 101.

In operation 1505, the electronic device 101 may receive an action frame from the external electronic device 103, wherein, in an embodiment, the received action frame may include a vendor-specific content as a vendor-specific action frame, and the vendor-specific content may include PMK lifetime information of the external electronic device 103.

According to an embodiment, a PMK renewal time may be configured based on the PMK lifetime information of the electronic device 101 and the PMK lifetime information of the external electronic device 103. The PMK lifetime of the electronic device 101 and the PMK lifetime of the external electronic device 103 may have the same value or different values, wherein the PMK is managed such that the PMKs of the electronic device 101 and the external electronic device 103 have the same value, and thus, the PMK may be renewed when the PMK lifetime of one of the electronic device 101 and the external electronic device 103 has expired or is expected to expire.

To this end, the PMK renewal time may be configured with a smaller value among the PMK lifetime of the electronic device 101 and the PMK lifetime of the external electronic device 103. In an embodiment, when the PMK lifetime of the electronic device 101 and the PMK lifetime of the external electronic device 103 have the same value, the PMK renewal time may be configured with a value of one of the PMK lifetime of the electronic device 101 and the PMK lifetime of the external electronic device 103.

In operation 1506, when the PMK renewal time has expired or is expected to expire, the electronic device 101 and the external electronic device 103 may perform, in operations 1507 to 1509, the same or similar operations as operations 1501 to 1503 at a time point at which the PMK lifetime expires or a time point that is a predetermined time ahead of the time point at which the PMK lifetime expires, and renew the PMK in the process of performing the operations.

In operation 1510, the electronic device 101 may transmit an action frame to the external electronic device 103, wherein, in an embodiment, as a vendor-specific action frame, the transmitted action frame may include the renewed PMK lifetime information of the electronic device 101 as a vendor-specific content.

In operation 1511, the electronic device 101 may receive the action frame from the external electronic device 103, wherein, in an embodiment, as a vendor-specific action frame, the received action frame may include the renewed PMK lifetime information of the external electronic device 103 as a vendor-specific content.

A PMK renewal time may be reconfigured based on the renewed PMK lifetime information of the electronic device 101 and the renewed PMK lifetime information of the external electronic device 103. The renewed PMK lifetime of the electronic device 101 and the renewed PMK lifetime of the external electronic device 103 may have the same value or different values, wherein the PMK is managed such that the PMKs of the electronic device 101 and the external electronic device 103 have the same value, and thus, the PMK may be renewed again when the renewed PMK lifetime of one of the electronic device 101 and the external electronic device 103 has expired or is expected to expire. According to an embodiment, the PMK renewal time may be configured with a smaller value among the renewed PMK lifetime of the electronic device 101 and the renewed PMK lifetime of the external electronic device 103. In an embodiment, when the PMK lifetime of the electronic device 101 has the same value as the PMK lifetime of the external electronic device 103, the PMK renewal time may be configured with a value of one of the PMK lifetime of the electronic device 101 and the PMK lifetime of the external electronic device 103.

When the PMK renewal time expires, operations 1507 to 1511 may be repeatedly performed. According to an embodiment, the PMK lifetime of the electronic device 101 or the external electronic device 103 may have a fixed value, and the PMK lifetime may not be transmitted in operations 1510 and 1511 in FIG. 15 when the PMK lifetime has a fixed value.

As shown in FIG. 15, when the action frame is used for exchanging of the PMK lifetime, the electronic device 101 and the external electronic device 103 may be implemented to interpret a vendor-specific content included in the action frame.

Figure 16:
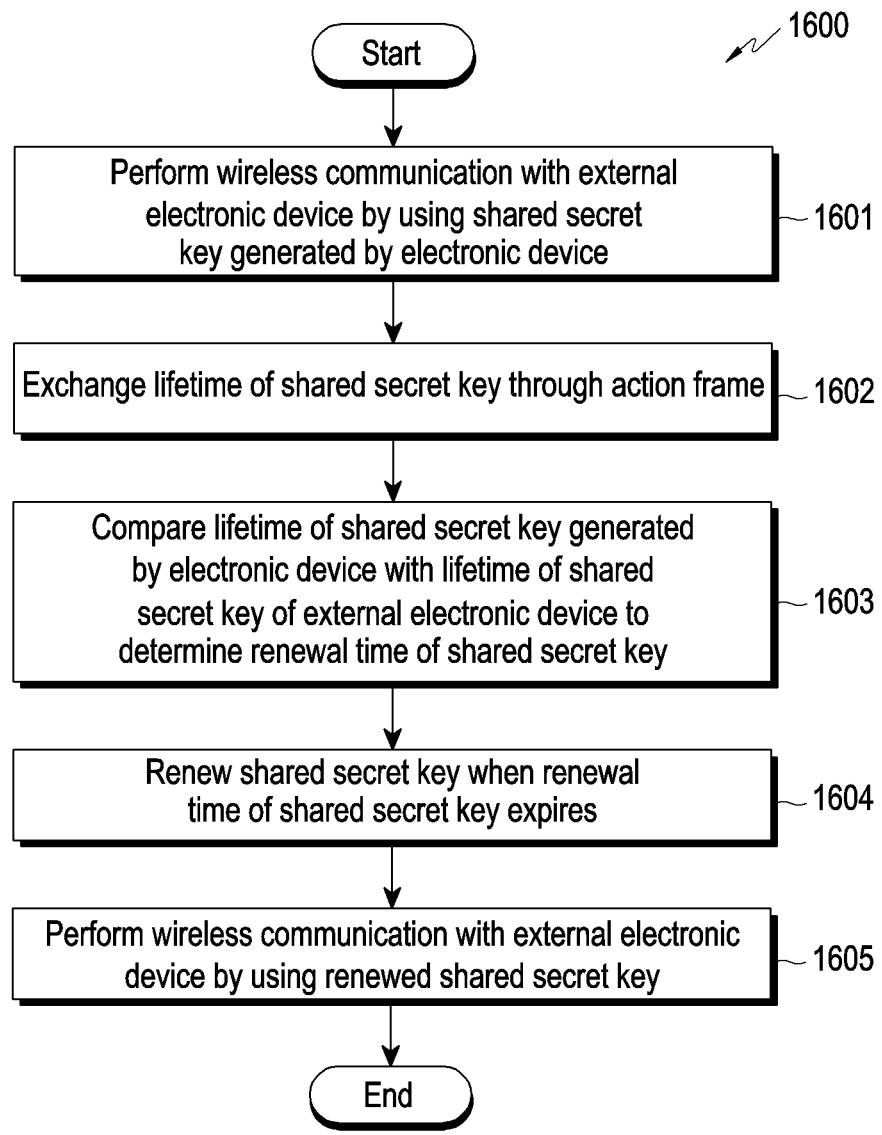
FIG. 16 is a flowchart illustrating an example PMK renewal procedure of an electronic device according to a wireless communication technology according to various embodiments.

FIG. 16 is a flowchart 1600 illustrating an example shared secret key renewal procedure of an electronic device according to a wireless communication technology according to an embodiment.

Referring to FIG. 16, in operation 1601, an electronic device 101 may perform wireless communication with an external electronic device 103 using a shared secret key (e.g., a PMK) generated in the process of authentication and association with the external electronic device 103.

In operation 1602, a processor 204 of the electronic device 101 may exchange information on a lifetime of a shared secret key (e.g., a PMK lifetime) with the external electronic device 103 through transmission of an action frame to the external electronic device 103 and reception of an action frame from the external electronic device 103 through a communication circuit 202. In an embodiment, the action frame transmitted to the external electronic device 103 may include a vendor-specific information element as a vendor-specific action frame, and the vendor-specific information element may include lifetime information of the shared secret key of the electronic device 101. In an embodiment, the action frame received from the external electronic device 103 may include a vendor-specific information element as a vendor-specific action frame, and the vendor-specific information element may include the lifetime information of the shared secret key of the external electronic device 103.

In operation 1603, the processor 204 of the electronic device 101 may configure (e.g., determine) a renewal time of the shared secret key, based on the lifetime information of the shared secret key of the electronic device 101 and the lifetime information of the shared secret key of the external electronic device 103, exchanged in operation 1602. According to an embodiment, the lifetime information of the shared secret key of the electronic device 101 and the lifetime information of the shared secret key of the external electronic device 103 may have the same value or different values, wherein the shared secret key is managed such that the shared secret keys of the electronic device 101 and the external electronic device 103 may have the same value, and thus, the shared secret key may be renewed when a lifetime of a shared secret key of one of the electronic device 101 and the external electronic device 103 has expired or is expected to expire. According to an embodiment, the processor 204 of the electronic device 101 may configure a renewal time of the shared secret key with a smaller value among the lifetime of the shared secret key of the electronic device 101 and the lifetime of the shared secret key of the external electronic device 103. In an embodiment, when the lifetime of the shared secret key of the electronic device 101 and the lifetime of the shared secret key of the external electronic device 103 have the same value, the renewal time of the shared secret key may be configured with a value of one of the lifetime of the shared secret key of the electronic device 101 and the lifetime of the shared secret key of the external electronic device 103.

In operation 1604, the processor 204 of the electronic device 101 may identify whether the configured renewal time of the shared secret key has expired, and when it is identified that the renewal time of the shared secret key has expired or is expected to expire, the processor 204 of the electronic device 101 may renew the shared secret key. In this case, the processor 204 of the electronic device 101 may transmit a shared secret key renewal frame, a deauthentication frame, a disassociation frame, or a vendor-specific action frame to the external electronic device 103.

In operation 1605, the processor 204 of the electronic device 101 may perform wireless communication with the external electronic device 103 through a communication circuit 202 using the renewed shared secret key.

In operation 1604, when the renewal time of the shared secret key has not expired or is not expected to expire within a predetermined time, the processor 204 of the electronic device 101 may maintain the association with the external electronic device 103 until a time point at which expiration of the renewal time of the shared secret key is expected.

As shown in FIGS. 13 to 16, when the electronic device 101 and the external electronic device 103 exchange lifetimes of a shared secret key (e.g., PMK) with each other to identify, in advance, a time point at which the shared secret key should be renewed, and when the external electronic device 103 receives a signal (e.g., an authentication request message, a renewal frame (e.g., a vendor-specific action frame), a deauthentication frame, or a disassociation frame of a shared secret key (e.g., PMK)) for a renewal of the shared secret key from the electronic device 101 at a time point at which the shared secret key should be renewed, the operation described above is recognized as a normal operation, and thus, usability of a wireless network can be improved. According to an embodiment, in a communication association with the external electronic device 103, when a renewal time of a shared secret key expires and the communication association with the external electronic device 103 ends, the electronic device 101 may perform an authentication procedure with the external electronic device 103 so as to avoid performing an unnecessary scan operation and consuming time and power.

A method for renewing a shared secret key in an electronic device (e.g., the electronic device 101) according to various example embodiments of the disclosure may include: performing wireless communication with an external electronic device (e.g., the external electronic device 103) through a communication circuit (e.g., the communication circuit 202) of the electronic device (e.g., the electronic device 101), based on a shared secret key generated by the electronic device (e.g., the electronic device 101) in a process of configuring an association with the external electronic device (e.g., the external electronic device 103), transmitting, to the external electronic device (e.g., the external electronic device 103) through the communication circuit (e.g., the communication circuit 202), a renewal frame for renewing the shared secret key, at a time point at which a lifetime of the shared secret key expires or a time point a specified time ahead of the time point at which the lifetime of the shared secret key expires, and renewing the shared secret key to perform wireless communication with the external electronic device (e.g., the external electronic device 103) through the communication circuit (e.g., the communication circuit 202), based on the renewed shared secret key.

In various example embodiments, the renewal frame may correspond to a deauthentication frame which releases an authentication with the external electronic device (e.g., the external electronic device 103), or a disassociation frame which releases an association with the external electronic device (e.g., the external electronic device 103), wherein the deauthentication frame or the disassociation frame includes a vendor-specific content field including information requesting a renewal of the shared secret key from the external electronic device.

In various example embodiments, the renewal frame may correspond to an action frame configured to perform an operation agreed with the external electronic device (e.g., the external electronic device 103) in advance, wherein the action frame includes a vendor-specific content field including information requesting a renewal of the shared secret key from the external electronic device (e.g., the external electronic device 103).

In various example embodiments, the method may further include, at the time point at which the lifetime of the shared secret key expires, or at the time point a specified time ahead of the time point at which the lifetime of the shared secret key expires, attempting a reassociation with the external electronic device (e.g., the external electronic device 103) through the communication circuit (e.g., the communication circuit 202) without performing a scan operation for searching for another external electronic device, or attempting a reassociation with the external electronic device (e.g., the external electronic device 103) through the communication circuit (e.g., the communication circuit 202) by performing a part of the scan operation for searching for another external electronic device.

In various example embodiments, the method may further include, in a process of association with the external electronic device (e.g., the external electronic device 103), transmitting information relating to a first lifetime of the shared secret key, to the external electronic device (e.g., the external electronic device 103) through the communication circuit (e.g., the communication circuit 202), and receiving information relating to a second lifetime of the shared secret key generated by the external electronic device (e.g., the external electronic device 103), from the external electronic device (e.g., the external electronic device 103) through the communication circuit (e.g., the communication circuit 202).

In various example embodiments, a renewal time of the shared secret key may be determined based on the information relating to the first lifetime and the information relating to the second lifetime, and the transmitting of the renewal frame may further include transmitting the renewal frame through the communication circuit (e.g., the communication circuit 202), based on the renewal time of the shared secret key.

In various example embodiments, the renewal time of the shared secret key may be determined based on one of the first lifetime and the second lifetime based on the first lifetime having a value identical to that of the second lifetime, and the renewal time of the shared secret key may be determined based on a smaller value among the first lifetime and the second lifetime based on the first lifetime having a value different from that of the second lifetime.

In various example embodiments, the method may further include, based on an association process for wireless communication with the external electronic device (e.g., the external electronic device 103), transmitting an action frame including information relating to a first lifetime of the shared secret key to the external electronic device (e.g., the external electronic device 103) through the communication circuit (e.g., the communication circuit 202), and receiving an action frame including information relating to a second lifetime of the shared secret key generated by the external electronic device (e.g., the external electronic device 103), from the external electronic device (e.g., the external electronic device 103) through the communication circuit (e.g., the communication circuit 202).

In various example embodiments, a renewal time of the shared secret key may be determined based on the information relating to the first lifetime and the information relating to the second lifetime, and the transmitting of the renewal frame may include transmitting the renewal frame through the communication circuit (e.g., the communication circuit 202), based on the renewal time of the shared secret key.

In various example embodiments, the renewal time of the shared secret key may be determined based on one of the first lifetime and the second lifetime based on the first lifetime having a value identical to that of the second lifetime, and the renewal time of the shared secret key may be determined based on a smaller value among the first lifetime and the second lifetime based on the first lifetime having a value different from that of the second lifetime.

In addition, the structure of data used in the above-described embodiments of the disclosure may be recorded in a non-transitory computer-readable recording medium through various means. The non-transitory computer-readable recording medium includes a storage medium such as a magnetic storage medium (for example, a ROM, a floppy disk, a hard disk, etc.) and an optical read medium (e.g., a CD-ROM, a DVD, etc.).

A non-transitory computer-readable recording medium in which programs executable in a computer are recorded may record a program for executing, to perform a shared secret key renewal in an electronic device, performing wireless communication with an external electronic device through a communication circuit of the electronic device, based on a shared secret key generated by the electronic device in a process of an association with the external electronic device, transmitting, to the external electronic device through the communication circuit, a renewal frame for renewing the shared secret key, at a time point at which a lifetime of the shared secret key expires or at a time point that is a specified time ahead of the time point at which the lifetime of the shared secret key expires, and renewing the shared secret key to perform wireless communication with the external electronic device through the communication circuit, based on the renewed shared secret key.

While the disclosure has been illustrated and described with reference to various example embodiments thereof, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a communication circuit;
   one or more processors; and
   memory storing one or more programs,
   wherein the one or more programs are configured to be executed by the one or more processors, the one or more programs including instructions for:
      determining a lifetime of a shared secret key which is a pairwise master key (PMK) based on first lifetime information corresponding to a first lifetime of the shared secret key and second lifetime information corresponding to a second lifetime of the shared secret key, wherein the first lifetime of the shared secret key is generated by the electronic device and the second lifetime of the shared secret key is generated by an access point (AP), controlling the electronic device to perform wireless communication with the access point, based on the shared secret key,
controlling the communication circuit to transmit, to the AP, a renewal frame for renewing the shared secret key using a security protocol, at a time point at which thea lifetime of the shared secret key expires or a time point a specified time ahead of the time point at which the lifetime of the shared secret key expires,
renewing the shared secret key by performing an authentication and association procedure with the AP, and
controlling the electronic device to perform wireless communication with the AP, based on the renewed shared secret key.

2. The electronic device of claim 1, wherein the renewal frame corresponds to a deauthentication frame which releases an authentication with the AP, or a disassociation frame which releases an association with the AP, and
wherein the deauthentication frame or the disassociation frame comprises a vendor-specific content field including information requesting a renewal of the shared secret key from the AP.

3. The electronic device of claim 1, wherein the renewal frame corresponds to an action frame configured to perform a previously agreed-to operation with the AP, and
wherein the action frame comprises a vendor-specific content field including information requesting a renewal of the shared secret key from the AP.

4. The electronic device of claim 1, wherein the one or more programs further include instructions for attempting a reassociation with the AP without performing a scan operation for searching for another AP, or attempt a reassociation with the AP by performing a part of the scan operation for searching for another AP, at the time point at which the lifetime of the shared secret key expires, or at the time point a specified time ahead of the time point at which the lifetime of the shared secret key expires.

5. The electronic device of claim 1, wherein the one or more programs further include instructions for:
in a process of configuring an association with the AP,
transmitting the first lifetime information to the AP, through the communication circuit, and
receiving the second lifetime information, from the AP, through the communication circuit.

6. The electronic device of claim 5, wherein the one or more programs further include instructions for:
based on an association process for wireless communication with the AP,
transmitting an action frame including the first lifetime information to the AP through the communication circuit, and
receiving an action frame including the second lifetime information generated by the AP, from the AP, through the communication circuit.

7. The electronic device of claim 6, wherein the one or more programs further include instructions for:
determining a renewal time of the shared secret key, based on the first lifetime information and the second lifetime information, and
transmitting the renewal frame through the communication circuit, based on the renewal time of the shared secret key.

8. The electronic device of claim 1, wherein the one or more programs further include instructions for:
based on an association process for wireless communication with the AP,
transmitting an action frame including the first lifetime information to the AP through the communication circuit, and
receiving an action frame including the second lifetime information generated by the AP, from the AP, through the communication circuit.

9. The electronic device of claim 8, wherein the one or more programs further include instructions for:
determining a renewal time of the shared secret key, based on the first lifetime information and the second lifetime information, and
transmitting the renewal frame through the communication circuit, based on the renewal time of the shared secret key.

10. The electronic device of claim 9, wherein the one or more programs further include instructions for:
determining the renewal time of the shared secret key, based on one of the first lifetime and the second lifetime, based on the first lifetime having a value identical to that of the second lifetime, and/or
determining the renewal time of the shared secret key, based on a smaller value among the first lifetime and the second lifetime, based on the first lifetime having a value different from that of the second lifetime.

11. A method for renewing a shared secret key in an electronic device, the method comprising:
determining a lifetime of a shared secret key which is a pairwise master key (PMK) based on first lifetime information corresponding to a first lifetime of the shared secret key and second lifetime information corresponding to a second lifetime of the shared secret key, wherein the first lifetime of the shared secret key is generated by the electronic device and the second lifetime of the shared secret key is generated by an access point (AP),
performing wireless communication with the access point (AP) through a communication circuit of the electronic device, based on a shared secret key,
transmitting, to the AP through the communication circuit, a renewal frame for renewing the shared secret key using a security protocol, at a time point at which a lifetime of the shared secret key expires or a time point that is a specified time ahead of the time point at which the lifetime of the shared secret key expires, and
renewing the shared secret key by performing an authentication and association procedure with the AP, and performing wireless communication with the AP through the communication circuit, based on the renewed shared secret key.

12. The method of claim 11, wherein the renewal frame corresponds to a deauthentication frame which releases an authentication with the AP, or a disassociation frame which releases an association with the AP, and
wherein the deauthentication frame or the disassociation frame comprises a vendor-specific content field including information requesting a renewal of the shared secret key from the AP.

13. The method of claim 11, wherein the renewal frame corresponds to an action frame configured to perform a previously agreed-to operation with the AP in advance, and
wherein the action frame comprises a vendor-specific content field including information requesting a renewal of the shared secret key from the AP.

14. The method of claim 11, further comprising, at the time point at which the lifetime of the shared secret key expires, or at the time point a specified time ahead of the time point at which the lifetime of the shared secret key expires, attempting a reassociation with the AP through the communication circuit without performing a scan operation for searching for another AP, or attempting a reassociation with the AP through the communication circuit by performing a part of the scan operation for searching for another AP.

15. The method of claim 11, further comprising, in a process of configuring an association with the AP, transmitting the first lifetime information, to the AP, through the communication circuit, and receiving the second lifetime information generated by the AP, from the AP, through the communication circuit.

16. The method of claim 15, wherein a renewal time of the shared secret key is determined based on the first lifetime information and the second lifetime information, and wherein the transmitting of the renewal frame comprises transmitting the renewal frame through the communication circuit, based on the renewal time of the shared secret key.

17. The method of claim 16, wherein the renewal time of the shared secret key is determined based on one of the first lifetime and the second lifetime, based on the first lifetime having a value identical to that of the second lifetime, and wherein the renewal time of the shared secret key is determined based on a smaller value among the first lifetime and the second lifetime, based on the first lifetime having a value different from that of the second lifetime.

18. The method of claim 11, further comprising, based on an association process for wireless communication with the AP, transmitting an action frame including the first lifetime information to the AP through the communication circuit, and receiving an action frame including the second lifetime information generated by the AP, from the AP, through the communication circuit.

19. The method of claim 18, wherein a renewal time of the shared secret key is determined based on the first lifetime information and the second lifetime information, and wherein the transmitting of the renewal frame comprising transmitting the renewal frame through the communication circuit, based on the renewal time of the shared secret key.

20. The method of claim 19, wherein the renewal time of the shared secret key is determined based on one of the first lifetime and the second lifetime, based on the first lifetime having a value identical to that of the second lifetime, and/or wherein the renewal time of the shared secret key is determined based on a smaller value among the first lifetime and the second lifetime, based on the first lifetime having a value different from that of the second lifetime.

\* \* \* \* \*